Oct. 20, 1925.
C. D. WILLIAMS
1,558,211
LINE TESTING APPARATUS
Filed May 4, 1922
2 Sheets-Sheet 2
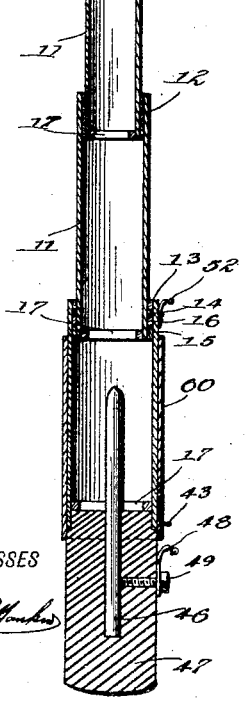
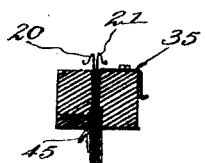
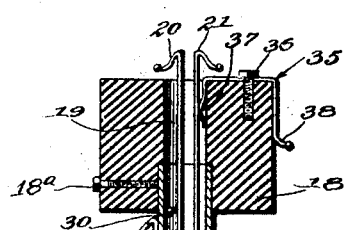
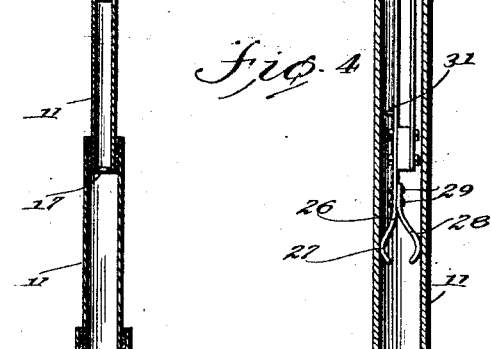
WITNESSES
INVENTOR
C. D. Williams,
BY
ATTORNEYS Patented Oct. 20, 1925.

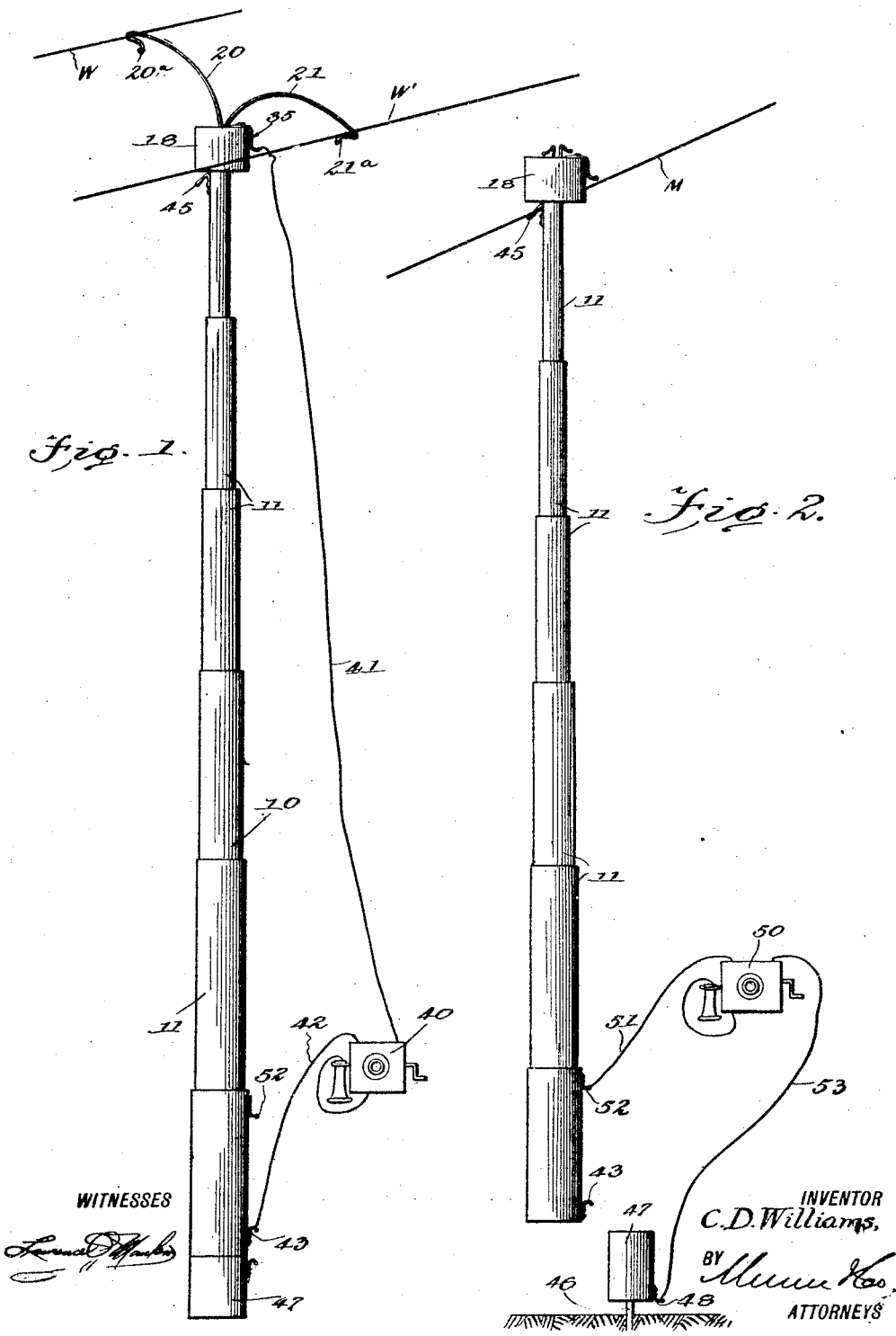

1,558,211

UNITED STATES PATENT OFFICE.

CHARLES DAVID WILLIAMS, OF SILVER LAKE, KANSAS.

LINE-TESTING APPARATUS.

Application filed May 4, 1922. Serial No. 558,423.

*To all whom it may concern:*

Be it known that I, CHARLES D. WILLIAMS, a citizen of the United States, and a resident of Silver Lake, in the county of Shawnee and State of Kansas, have invented certain new and useful Improvements in Line-Testing Apparatus, of which the following is a specification.

This invention relates to an improved line testing apparatus, and has for its object to provide an apparatus of this character which is equally well adapted for testing metallic circuits or grounded circuits; which may be readily adjusted for testing either type of circuit, which when not in use is compact, susceptible of convenient carrying or handling, and which is safe and reliable in operation and simple and durable in construction, and comparatively inexpensive to manufacture.

Other objects and advantages of the intion reside in certain noval features of construction, combination and arrangement of parts which will be hereinafter more fully described and particularly pointed out in the appended claims, reference being had to the accompanying drawings forming part of this specification, and in which:

Figure 1 is a perspective view, illustrating the invention employed in testing a metallic circuit;

Figure 2 is a similar view, showing the invention employed in testing a grounded circuit;

Figure 3 is a view in longitudinal vertical section;

Figure 4 is an enlarged view in longitudinal vertical section, illustrating the head and associated structure, the line connections being contracted;

Figure 5 is a similar view, showing the line connections expanded;

Figure 6 is a detail view in section, showing the manner in which the line connections are insulated; and Figure 7 is a detail perspective view of one of the guide rings.

Referring to the drawings wherein for the sake of illustration is shown the preferred embodiment of the invention, the numeral 10 designates a staff or standard made up of a plurality of telescoping sections constructed of metal such as copper or other good electrical conductor and designated at 11. The adjacent sections 11 of the telescopic shaft are connected with each other by means of joints, designated generally at 12. These joints are of identical construction and each comprises an upper stop ring 13 brazed or otherwise suitably connected to the outer of the adjacent telescopic tubes or sections. Spaced guide rings, designated at 14 and 15 are brazed or otherwise suitably connected to the inner of the telescopic sections and arranged within the outer of the adjacent telescopic sections. Between the guide rings 14 and 15 an expansion ring 16 is arranged and comprises a split ring of resilient metal which is under tension and which engages the guide rings 14 and 15 and the outer tube to maintain adjacent sections of the telescopic tube in any position to which it may be adjusted. A stop ring 17 is carried by each of the sections 11 to limit the movement of the inner sections within the outer sections. A head 18 is secured to the outer end of the small section 11 of the telescopic shaft by a screw 18$^a$ and preferably is constructed of insulating material. The head is provided with a central opening 19 alined with the opening or bore of the telescopic staff.

A pair of spring line connections, designated at 20 and 21 are provided and comprise flat strips of resilient metal, such as copper or the like, operating in the bore of the head 18 and in the upper section 11 of the telescopic shaft and connected to each other in spaced relation by means of the insulating block 22 and bolts 23 and nuts 24 extending through bolt holes in the connectors 20 and 21 and in the insulating block 22, and suitably insulated from the connectors 21 as by means of fiber washers 25$^a$ interposed between the heads of the bolts and the connector 20 and by means of insulating tubes or sleeves 25 embracing the bolts.

The connector 20 is provided with an extension 26 which is curved outwardly to provide a contact member or shoe 27 having sliding contact with the wall of the upper section 11 of the telescopic shaft and a second shoe 28 also curved and constructed of resilient metal such as copper is oppositely arranged with respect to the shoe 27 and is secured to the extension 26, as at 29, and these shoes 27 and 28 serve to electrically connect the line connectors 20 with the staff and they also serve as a friction device to maintain the line connectors 20 and 21 in any position to which they may be adjusted.

Means is provided for preventing the line connectors from being entirely withdrawn from the section 11 of the telescopic shaft in which they operate, such means preferably comprising a stop lug 30 carried by said section 11 and a stop lug 31 carried by the line connector 20, the stop lugs being engageable with each other to limit the outward movement of the spring line connector assembly. If desired suitable means may be provided for preventing the line connector assembly from turning in the opening of the head and telescopic shafts although ordinarily the shoes 27 and 28 are sufficient to do this. Any suitable means may be employed for this purpose, and one mode in which this may be accomplished is by having the shoes 27 and 28 operate in guideways or having these shoes carry pins operating in the guide grooves or by reversing such arrangement.

The line connectors 20 and 21 are adapted to occupy a retracted position such as shown in Figure 4 in which position they are disposed entirely within the head 18 and the outer or upper telescopic section 11 and are housed and protected, or they may occupy an expanded position such as shown in Figures 1 and 5. When the spring line connectors are expanded they are adapted for connection with wires W and W', the ends of the connectors having knife edge contacts, designated at 20ª and 21ª formed thereon, the knife edge contacts firmly gripping the wires W and W' so as to insure proper electrical connection between the wires and the connectors.

A contact 35 is rigidly connected, as at 36, to the head and has a spring portion 37 engaging the line connector 21 and a wire clamp or binding post 38. When the spring line connectors 20 and 21 are engaged with the wires W and W' of the metallic circuit, as shown in Figure 1, the apparatus is organized with a testing set of standard construction such as at 40 by means of a conductor or wire 41 leading from the binding post or clamp 38 to the testing set and a wire 42 leading from the testing set to a binding post or clamp 43 connected with the lower telescopic section 11 and thus electrically connected with the spring line connector 20 since the spring line connector is electrically coupled with the sections 11 of the staff, these sections being constructed of conducting material.

The apparatus is also adapted for use with a grounded circuit, the single metallic wire of which is designated at M and for this purpose the upper section 11 carries on its outer periphery immediately below the head 18 a knife edge wire connector 45 adapted to engage the wire M, as shown in Figure 2, and the apparatus also includes a ground rod 46 adapted to be driven into the ground, the ground rod being carried by an insulating plug 47 which fits into the lower telescopic section when the ground rod is not in use. A binding post or wire clamp 48 is connected with the ground rod by a screw 49. In testing a grounded circuit, a testing set 50 similar to the testing set 40 is electrically connected with the wire line conductor 45 by means of a wire 51 which leads from the testing set to a binding post or clamp 52 carried by the lowermost section 11 which in turn is electrically connected by the telescopic sections 11 with the wire line connector 45. A wire line 53 leads from the testing set to the binding post or wire clamp 48 of the ground rod, the ground rod being driven at this time into the ground, as shown in Figure 2.

An insulating sleeve or handle 60 embraces and encloses the lower telescopic section 11 so as to facilitate handling of the staff, the sleeve having a suitable opening to receive the binding post or clamp 43.

It is to be noted that by virtue of the formation of the contacts on the wire line connectors 20 and 21 and by virtue of the contact 45, that these contacts serve not only to electrically connect the staff to the wires but also to support the same.

I claim:

1. In a wire line testing apparatus, a hollow staff of conducting material, a head of insulating material supported upon the upper end of said staff and having an opening alined with the opening of said staff, wire line connectors mounted on the staff and operating in the opening of the staff in the head, said wire line connectors comprising strips of resilient metal, a block of insulating material interposed between the inner portions of the strips and fastening devices for securing the strips to the block whereby the strips are mechanically connected and electrically insulated, one of said strips having electric contact with the hollow staff, the other strip being spaced and insulated from the hollow staff, and a binding post carried by the head and having electric contact with the strip insulated from the hollow staff.

2. In a wire line testing apparatus, a staff having an opening and a pair of wire line connectors carried by the staff and comprising strips of resilient metal, said strips being mechanically connected adjacent their inner ends in spaced relation and being electrically insulated, the strips being formed and tensioned to diverge from each other in extended position and being urged toward each other and being housed in the opening of the staff in the retracted position of the wire line connectors.

3. In a wire line testing apparatus, a hollow staff of conducting material, a wire line connector carried by the upper end of said hollow staff, a binding post carried by the lower end of said hollow staff, and a plug releasably fitted in the lower end of the hollow staff and having a ground rod adapted for electrical connection with the binding post and also adapted to be driven into the ground.

4. In a wire line testing apparatus, a hollow staff, a head at the upper end of said staff having an opening communicating with the opening of the hollow staff, wire line connectors operating in the opening of said head and of said hollow staff and comprising flat strips of resilient metal, an insulating block arranged between said flat strips and secured thereto to maintain said connectors in spaced relation and insulated from each other, one of said wire line connectors being extended inwardly beyond said block and having a curved portion constituting a shoe engageable with the hollow staff, and a second shoe secured to the extension and oppositely arranged with respect to the first shoe and also engageable with the hollow staff, said shoe serving to electrically connect with said wire line connectors with said hollow staff and serving as a friction device to adjustably maintain the wire line connectors in position, and a contact carried by the head and engageable with the other of said wire line connectors.

CHARLES DAVID WILLIAMS.